2 Sheets--Sheet 1.

C. B. TRUE.
Sewing-Machines.

No. 148,336. Patented March 10, 1874.

WITNESSES.
Thomas H. Cosgrove
Orrin L. Bosworth

INVENTOR.
Cyrus B. True

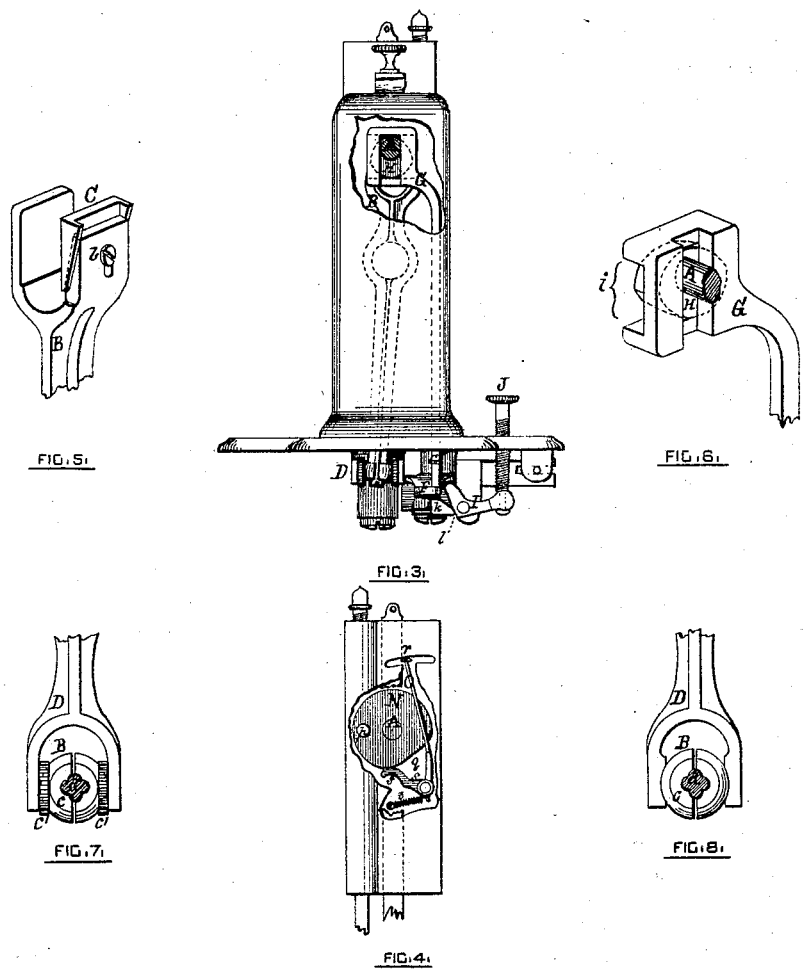

UNITED STATES PATENT OFFICE.

CYRUS B. TRUE, OF PROVIDENCE, RHODE ISLAND.

IMPROVEMENT IN SEWING-MACHINES.

Specification forming part of Letters Patent No. 148,336, dated March 10, 1874; application filed October 14, 1873.

*To all whom it may concern:*

Be it known that I, CYRUS B. TRUE, of the city and county of Providence, in the State of Rhode Island, have invented certain new and useful Improvements in Sewing-Machines.

My invention consists, first, in the combination of certain novel devices with a laterally and vertically vibrating feed-bar lever, whereby the four requisite motions of the said feed-bar are easily and noiselessly effected; secondly, in a novel combination, with said feed-bar lever, of a longitudinally-reciprocating bar actuated by and through its connection with the main shaft, and a bell-crank lever provided with an inclined face on one of its arms, and adjustable on its fulcrum, whereby the movement of the feed-bar may be graduated and adjusted; thirdly, in the combination, with the jaws of a bifurcated vibrating lever, and the lever from which it derives, or to which it imparts, its motion, of an expansible ball at their junction with each other, whereby undue wear of the coincident contact faces of the ball and jaws may be readily compensated; fourthly, in a novel combination, with the jaws of a bifurcated vibrating lever, of an expansible ball and concave sliding bearings fitted thereto, and also to the inner coincident faces of the jaws of said lever, whereby objectionable friction of the parts in operative contact is reduced to a minimum, their operation rendered noiseless, and the undue wear at all points readily compensated; fifthly, in combining with a spring take-up a controlling-cam mounted on the main shaft, and arranged in a novel manner with relation to the take-up, whereby, at the proper moment, during the movement of the needle-bar, the slack thread will be properly controlled, and also in other minor points, to which particular reference will hereafter be made; and I do hereby declare that the following specification, taken in connection with the drawings furnished and forming a part thereof, is a clear, true, and accurate description of a sewing-machine embodying the several features of my invention.

Although some of the novel elements shown are applicable to sewing-machines in general, many of them are applicable only to that particular class in which vibrating levers are employed for giving the requisite movement to the shuttle, and, therefore, I have selected, for the better illustration of my invention, a machine of that character.

Figure 1:
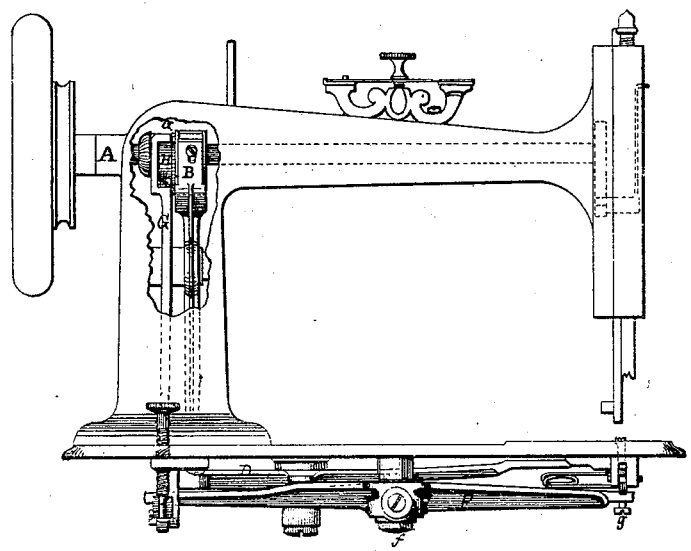
Figure 2:
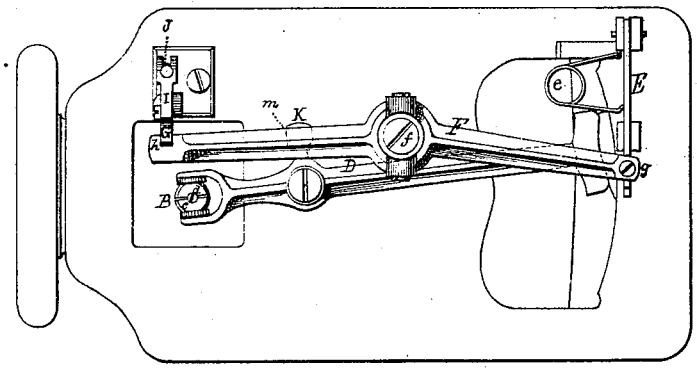

Referring to the two sheets of drawings, Figure 1 represents, in side view, a machine which embodies my invention detached from the table. Fig. 2 represents the same as viewed from below. Fig. 3, Sheet 2, represents the rear of the same in end view with main shaft-wheel removed. Fig. 4 represents a portion of the machine in front-end view with a portion of the casing removed, and showing the novel take-up mechanism. Fig. 5 shows the device for graduating the receptive capacity of the jaws of a bifurcated lever. Fig. 6 shows a portion of the main shaft, a cam thereon, and its connection with a vertically-reciprocating bar, which actuates the feed-bar in its forward longitudinal movement. Fig. 7 shows the novel adjustable lever-ball and its sliding bearings fitted to the coincident faces of the jaw of a bifurcated lever, in this instance employed for actuating the shuttle. Fig. 8 shows a similar adjustable lever-ball directly fitted to the jaw of a lever. Fig. 9 shows, in perspective, the tension-plate with its self-adjusting friction-bed.

In all the figures, A denotes the main shaft. The needle-bar, presser-bar, shuttle, and its carrier are not unlike those found in other machines of this class, and require no detailed description in this connection. B denotes the vertically-vibrating lever, for actuating the shuttle-lever D. It is bifurcated at its upper end and embraces an actuating-cam, *a*, on the main shaft. As the contact surfaces of the cam and the coincident faces are liable to undue wear, I have provided the adjustable face-block C, shown in detail in Fig. 5. The rear of the block is channeled, so as to receive the jaw and secure it against lateral movement thereon, and yet be capable of adjustment longitudinally, and of being rigidly set by means of the screw *b* and a slot in the jaw. The face-block is thicker at one end than at the other, and, by moving it in the direction of its thinnest end, the cam on the main shaft will be more closely embraced between it and the coincident face of the jaw, and this adjustment can readily be effected by any person of competent judgment, whenever undue wear has occurred to such an extent as to be at all perceptible in the operation of the machine. At the lower end of lever B is a ball, c, which is so divided by a slot, in a line with the axis of the lever, that the two sections may be forced apart by the advancing of a conical screw, d, or any equivalent device introduced between the sections, and having the function of a wedge. The depth of the slot toward the axis or pivoted fulcrum of the lever should be sufficient to admit of the proper separation of the sections, and of their resuming their normal position on the withdrawal of the spreading device. As the contact surfaces become worn a slight advancing of the expanding device will bring the parts into close relation, and obviate all lost motion. As shown in Fig. 7, the two concave sliding bearings c' are fitted with their outer sides to the plane interior faces of the jaws. Their inner sides are concave to receive the sides of the ball, as shown. In operation there is a slight movement of the bearings longitudinally in the jaw, and they are free, in other respects, to follow the movement of the ball. The depth of the concavity in each is sufficient to hold them in proper position when the ball is properly expanded. E denotes the four-motion feed-bar. Its downward and retreating movements are effected by a compound spring, e, composed of a single piece of spring-wire, so bent as to present two straight arms extending from opposite sides of a complete coil. The outer end of one of the arms is rigidly fixed to a lug or ear on the under side of the bed-plate, and the outer end of the other arm engages with the feed-bar. The backward movement of the feed-bar is effected by the expansive force of the arms of the spring, and the downward movement by the retractile force of the coiled portion thereof. F denotes the feed-bar lever. It is provided with a complex fulcrum, composed of two axes, one of which is vertical and the other is horizontal and at right angles thereto. The lever is secured to the under side of the bed-plate by a screw, f, which constitutes the vertical fulcrum. The screw f is inclosed by a sleeve or bushing provided with a trunnion on each side, which constitute the horizontal fulcrum, and this complex fulcrum admits of a horizontal or laterally vibratory and a vertically-vibrating movement of the lever. The lever and feed-bar are connected, as at g, with a screw, which is snugly fitted to a tapped hole in the lower edge of the feed-bar. The screw-hole in the lever is round and well fitted to the body of the screw. To compensate for undue wear at this point, an oval steel bushing may be fitted to the body of the screw, having sufficient length thereon to admit of its contact, at its ends, with the under side of the head and the surface of the feed-bar, and so be held in any position. Whenever required, the bushing may be slightly turned on the screw, and made to occupy any space resulting from undue wear of the parts. The opposite end of the feed-bar lever is provided with a vertical slot, as at h, for the reception of the vertically-reciprocating bar G, which is the connecting device between the cam H on the main shaft and the feed-bar lever. The upper end of the bar G is provided with a head of peculiar construction, as shown in Fig. 6. It is vertically slotted to enable it to surround the main shaft, and be capable of a vertical movement effected by the cam H, in contact with the coincident surfaces of the channel i on one side of the head. One of the contact-surfaces may be made adjustable with relation to the other by means substantially as described, in connection with the jaws of the lever B, and thereby be capable of compensating for undue wear. The lower end of bar G is provided with a toe, as at k, which, by contact with an inclined surface, as at l, as the bar is raised, actuates the lever F, and gives to the feed-bar its forward movement. The surface l is the face of the vertical arm of a bell-crank lever, I, which is in communication, at the end of its horizontal arm, with an adjusting thumb-screw, J, which extends downward from the upper surface of the plate. In proportion as the vertical arm, with its surface l, is inclined toward the toe on the bar G, will the feed-bar be moved longitudinally. The spring e will always, by its action on the feed-bar, keep the opposite end of the lever F in contact with the bar G, and the toe k on bar G in close contact with the inclined surface l of the bell-crank lever. This construction and arrangement of the lever-bar G and bell-crank lever admit of compensation for undue wear of the several coincident contact-surfaces, as well as of the feed-adjustment.

I have already described the means by which the forward, backward, and downward motions of the feed-bar are effected, and it now remains to show how the upward movement is accomplished. On the side of the shuttle-lever D, adjacent to its fulcrum, is a laterally-projecting arm, K, (shown clearly in Fig. 2.) At a point on the upper side of the feed-bar lever F, midway between the fulcrum and its rear end, is a convex cam-surface at m, so located with relation to the arm K that the latter will be in contact therewith and the plane-surface on each side thereof, both toward the fulcrum and the end of the lever, at each vibration of the shuttle-lever D; and, by this movement, it will deflect the rear end of the feed-bar lever, raise the opposite end, and thus effect the upward movement of the feed-bar. Each of the two separate positive movements is properly timed with relation to the movement of the needle-bar, the return spring motions are promptly executed, and, as all the operative surfaces are held in close contact by the compound spring e, their operation, as a whole, is smooth, easy, and silent. L denotes the tension-plate, shown in perspective in Fig. 9. It is of the usual form, and provided with the adjusting thumb-screw n. N denotes a crank-plate on the main shaft, carrying a wrist-pin, p, for operating the needle-bar, and is clearly shown in Fig. 4. About three-quarters of its periphery is circular, and the remaining quarter is provided with a flat face, as at $q$, the edge constituting a cam for controlling the take-up by a positive movement. O denotes the take-up lever, provided with the usual thread-eye $r$ at its upper end. It is composed of spring wire, and has a capacity insufficient to break the threads in common use under any circumstances. Its base is connected with a pivoted lever, $s$, the outer end of which is held in close contact with the periphery of the cam during its revolution by the retractile spiral spring $t$, which is connected therewith by a finger on the lever $s$, below and adjacent to its pivot, at the proper moment, and wholly in concert with the movement of the needle-bar. The take-up is alternately actuated by the cam, and operated with results analogous to those effected by numerous other well-known thread-controlling devices, employing different mechanism.

Having thus described my invention, I claim as new, to be secured by Letters Patent—

1. The feed-bar and spring for effecting the two distinct return movements, in combination with the vertically and laterally vibrating feed-bar lever, which is operatively connected intermittingly with the main shaft, so that the feed-bar will be raised and carried forward by positive mechanical movement, and admit of the return movements of the feed-bar and its lever by spring action, substantially as described.

2. The combination, with a laterally-vibrating feed-bar lever, of a vertically-reciprocating bar, provided with a toe-cam, and working against an inclined face in contact with said toe, substantially as described.

3. The combination, with a laterally-vibrating feed-bar lever and a vertically-reciprocating bar, of a bell-crank lever, with a surface on one arm for contact with the bar, and an adjusting-screw at the other arm, substantially as described, whereby the feed-motion may be graduated, as set forth.

4. The vibrating lever provided with the expansible ball-connection, constructed in sections, and with an adjustable expanding device, in combination with a jaw for receiving the same, substantially as described.

5. The combination of the jaw of a vibrating lever and the ball-tip of a communicating lever with the sliding bearings $c'$ and an adjusting device, for maintaining proper contact of the ball with the bearings, and the bearings with the coincident faces of the jaw, substantially as described.

6. The combination of the cam N, the elastic spring take-up arm O, the connecting-lever $s$, and the spring $t$, for holding said lever in contact with the face of the cam, and arranged to operate substantially as described.

CYRUS B. TRUE.

Witnesses:
THOMAS F. COSGROVE,
ORRIN L. BOSWORTH.